Jan. 1, 1924
H. ZIEMSS, JR
TOY VEHICLE
Filed May 24, 1920
1,479,020
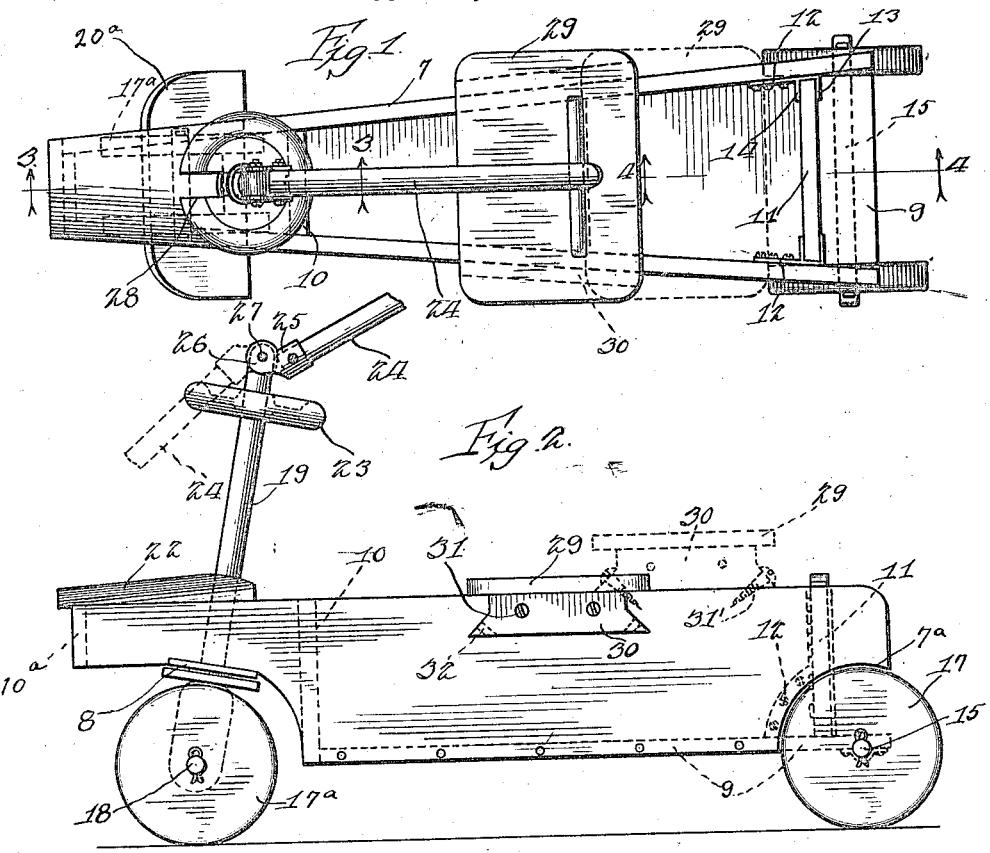
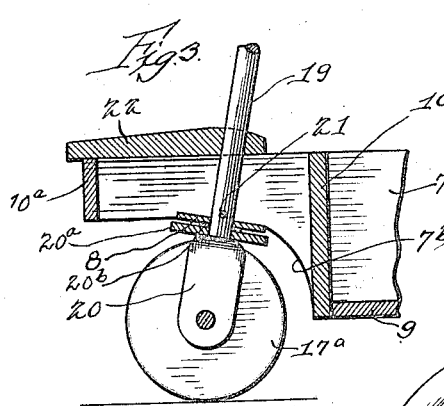
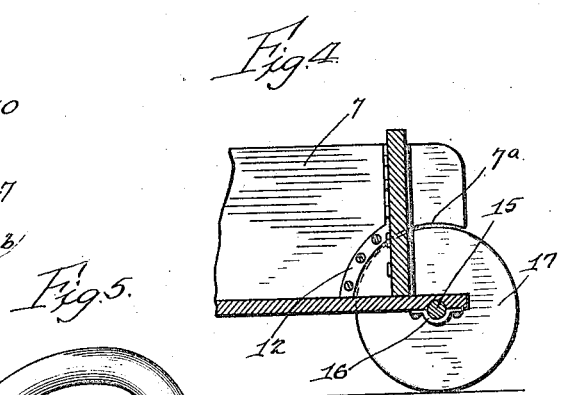
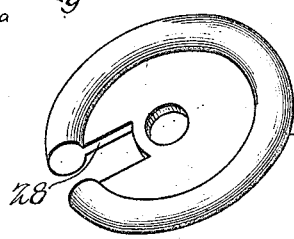
Witness:
David S. Magnusson.
Inventor:
Henry Ziemss, Jr.
By Miller Chindahl Parker
Attys.

Patented Jan. 1, 1924.

1,479,020

UNITED STATES PATENT OFFICE.

HENRY ZIEMSS, JR., OF CHICAGO, ILLINOIS.

TOY VEHICLE.

Application filed May 24, 1920. Serial No. 383,621.

*To all whom it may concern:*

Be it known that I, HENRY ZIEMSS, Jr., a citizen of the United States, residing at Chicago, in the county of Cook and State of Illinois, have invented certain new and useful Toy Vehicles, of which the following is a specification.

The invention relates to toy vehicles, and the principal object thereof is to provide a vehicle of advantageous construction which may be propelled by a child either while sitting upon the vehicle seat or by pushing the vehicle with one foot upon the ground while the other is supported at the rear end of the vehicle, as in the case of a wheeled coaster.

Other objects of the invention are to provide a vehicle of the character indicated, which is of a strong and rugged character, and to simplify the construction so that it may be manufactured at a relatively low cost.

A further object of the invention is to provide a vehicle having a seat which may be readily adjusted to accommodate children of various sizes.

Another object is to provide a vehicle which may be readily converted into a toy cart or wagon adapted to be drawn from the forward end of the vehicle and having a closed body portion or box for the reception of articles to be transported.

Still another object is to provide a construction and arrangement which presents an attractive appearance, the rear wheels of the vehicle being substantially enclosed within the side walls of the vehicle so as not to engage obstacles in the path of movement.

The objects of the invention thus generally stated, together with other and ancillary advantages, may be attained by the construction and arrangement illustrated in the accompanying drawings forming part hereof in which Figure 1 is a top plan view of a vehicle constructed in accordance with my invention. Fig. 2 is a side elevation of the same with the handle broken away. Fig. 3 is a fragmentary sectional view taken in the plane of line 3—3 of Fig. 1. Fig. 4 is a similar view taken in the plane of line 4—4 of Fig. 1. Fig. 5 is a perspective view of the steering wheel detached.

The vehicle comprises in general a pair of spaced longitudinal side members 7 arranged in diverging relation from the forward end of the body rearwardly. Said side members are suitably connected together as by means of a forward cross-piece 8, a bottom wall or supporting platform 9, and front walls 10 and 10$^a$. A rear wall or end gate 11 is adapted to be removably supported at the rear end of the body between the side members 7 for use when the vehicle is employed as a cart or wagon. This end gate may be secured in position by means of metallic side plates 12 each having a channel for receiving one end of the end gate, formed by a rear flange 13 and a plurality of lugs 14 struck up from the portion of the side plates 12 adjacent the ends of the end gate 11. At the rear end of the vehicle (Fig. 4) is an axle 15 mounted in cleats 16, the lower rear corners of the side members 7 being cut away as at 7$^a$ to receive the wheels 17 mounted upon opposite ends of the axle 15. By this arrangement it will be seen that the wheels 17 are substantially enclosed within the side members 7 and thus do not project outwardly to such an extent as to constitute objectionable projections likely either to be in the way of the feet when propelling the vehicle or to encounter obstacles in the path of the vehicle. The metallic plates 12 providing the support for the end gate 11 are suitably secured upon the inner sides of the side members, near the rear ends of the latter, and it will be seen serve as guards to prevent the entrance of dirt into the wagon box when the end gate is in position.

The forward end of the vehicle may be supported by one or more wheels which may be conveniently mounted upon the cross piece 8. Herein I have shown two wheels 17$^a$ mounted upon a pin 18 carried by the lower end of a steering rod 19, the rod being provided with a rectangular portion 20 at its lower end adapted to be entered between the wheels 17$^a$. At the upper end of said rectangular portion 20 is a cross-bar 20$^a$ fixed to the steering rod 19 and spaced from the cross-piece 8 by a washer 20$^b$ bearing upon the cross-piece 8. Said cross-bar 20$^a$ extends beyond the side members 7, (Fig. 1) so that the ends of the bar may be engaged by the feet of a child for the purpose of steering the vehicle. To hold the steering rod against downward movement with reference to the cross piece, a pin 21 may be secured to the steering rod above the cross piece 8. Preferably I provide at the forward end of the members 7 a top piece 22 simulating a hood for the vehicle body and providing a bearing for the steering rod 19. As shown clearly in Figs. 2 and 3, the lower forward ends of the side members 7 are cut away as at 7ᵇ to receive the wheels 17ᵃ.

Near its upper end the steering rod is provided with a steering wheel 23 which may be secured to the rod in any suitable manner. Preferably, however, the upper end of the steering rod extends a short distance above the steering wheel and has pivotally mounted thereon a handle 24 as by means of a bracket 25 having a pair of lugs 26 spaced apart and adapted to receive between them the flattened upper end of the steering rod. A pivot pin 27 entered through the upper end of the steering rod and the lugs serves to secure the handle to the rod. As shown in dotted lines in Fig. 2, the lower end of the handle 24 may be arranged to extend through the bracket 25 a distance such that it will engage with the rear side of the steering rod and thus limit the downward swinging movement of the handle. As shown in dotted lines in said figure, the handle is free to swing forwardly into an inoperative position, and to permit of the downward swinging movement of the handle to the desired degree, the steering wheel 23 is notched in its forward portion as at 28 (Fig. 5) to receive the handle 24. The handle 24 is made of such length as shown in Fig. 1, that it extends rearwardly over the body of the vehicle for steering or forwardly to a point in front of the vehicle to enable it to be conveniently drawn thereby.

Upon the side members 7 of the vehicle body, a seat member 29 is adapted to be supported in either of two elevations. As shown in full lines in Fig. 3, the seat member is provided near opposite sides with depending blocks 30 which diverge in a manner corresponding to the divergence of the members 7. Said blocks are spaced apart so that when they permit the seat member 29 to rest directly upon the side members, it is located in a convenient position with reference to the steering wheel 23 for a smaller child, and in this position the side blocks 30 are secured to the side members of the vehicle body as by means of screws 31. As shown in broken lines in Fig. 2, when the seat is moved rearwardly, to carry the side blocks 30 directly over the upper edges of the side members 7, the seat member is supported in a convenient position longitudinally of the body for a larger child. In this position the side blocks 30 are secured to the upper edges of the side members 7 as by means of the same or other screws 31′ entered through apertures 32 provided in forwardly and rearwardly projecting portions formed upon the side blocks as indicated in dotted lines.

It will be seen that I have provided a toy vehicle which is capable of a variety of uses by the child. With the handle 24 thrown forwardly to the position shown in broken lines in Fig. 2, a child seated upon the seat 29 may propel the vehicle by means of his feet engaging with the ground upon either side or opposite sides of the vehicle, and he steers the vehicle by manipulation of the steering wheel 23. In this use of the vehicle as by a smaller child, the vehicle may be readily drawn by an older person by means of the handle 24 as, for example, in crossing over street curbs and the like. In this event, the child may rest his feet upon the ends of the member 20ᵃ and steer the vehicle with his feet.

In this use of the vehicle also the end gate may be removed and deposited in the bottom of the vehicle body or elsewhere and a second child may ride upon the rear end of the vehicle.

With the end gate 11 in position, it will be apparent that the vehicle body constitutes a receptacle for articles to be transported, the vehicle being drawn by means of the handle 24 after the fashion of an ordinary cart or wagon.

When it is desired to use the vehicle as a coaster car, the handle is moved into the position shown in full lines in Figs. 1 and 2 and the end gate 11 removed so that one foot of the operator may be placed upon the bottom 9 of the vehicle body and the other foot free to engage the ground in propelling the vehicle in the well known manner.

It will be observed that the construction which I have provided presents a vehicle which is neat and attractive in appearance and which is of a very rugged and durable character. Moreover, the construction is exceedingly simple so that the toy may be manufactured at a low cost.

It is to be understood that while the invention has been herein illustrated and described with considerable particularity, it is contemplated that various changes may be made in construction and arrangement without departing from the spirit and scope of the invention as expressed in the following claims.

I claim as my invention:

1. A toy vehicle comprising a body having two longitudinally extending side members spaced apart and arranged in diverging relationship, rear supporting wheels, a forward supporting and steering wheel, steering means operatively associated with the steering wheel and including a steering member, a seat having depending supporting blocks adapted to either receive between them the diverging side members or rest directly upon the upper edges of the side members, and means for securing the said depending supporting blocks to said members.

2. A toy vehicle comprising a forward supporting and steering wheel, rear supporting wheels, a body having bottom, end and side walls with the bottom wall substantially in the plane of the axis of said forward and rear wheels and stopping short of the forward wheel, said side walls converging forwardly and having their lower portions constructed to clear the forward supporting wheel, an upwardly extending steering rod connected with said forward supporting and steering wheel and a steering arm pivotally mounted on the upper end of said steering rod for rotation about a horizontal axis, said arm being adapted for a tongue member when swung forwardly, and when swung rearwardly extending back substantially to the rear of the body.

3. A toy vehicle comprising a pair of spaced side members, a bottom member and forward and rear end members, rear supporting wheels and a forward supporting and steering wheel, said side members being cut away at their opposite ends to receive portions of the wheels, and a steering arm extending rearwardly over the vehicle body, said side members having upon their inner sides near their rear ends metallic plates providing channels for removably supporting the end member of the vehicle body and adapted to coact with the end member to close the rear end of the vehicle body.

4. A toy vehicle comprising a body providing a seat support and having rear supporting wheels and a forward supporting and steering wheel, a steering rod upon which said steering wheel is mounted, a hand wheel on said rod, and a steering arm pivotally mounted upon the upper end of the steering rod and adapted to extend over the forward end of the body, said hand wheel having a portion cut away to permit the steering arm to swing downwardly with reference thereto.

5. A toy vehicle comprising, in combination, a body providing a seat support, rear supporting wheels for the body, a forward supporting and steering wheel for the body, a steering rod, a foot-supporting platform supported by the body rearwardly of and below the seat, a steering arm pivotally mounted upon said steering rod so as to extend rearwardly over the seat, and means for normally supporting said steering arm in an elevated position over the seat.

6. A toy vehicle comprising a forward supporting and steering wheel, rear supporting wheels, a body having bottom, end and side walls with the bottom wall substantially in the plane of the axes of said forward and rear wheels, an upwardly extending steering rod connected with the forward wheel, a steering arm pivotally mounted on the steering rod for rotation about a horizontal axis, said arm being adapted to be swung forwardly for use as a tongue member and to be swung rearwardly within easy reach of an operator standing in the rear of the body, and means for normally supporting said arm in either its forwardly or rearwardly extending positions.

7. A toy vehicle comprising a forward supporting and steering wheel, rear supporting wheels, a body having bottom, end and side walls with the bottom wall substantially in the plane of the axes of said forward and rear wheels, said side walls converging and projecting forwardly and having their lower portions cut away to clear the forward supporting wheel, an upwardly extending steering rod connected with the forward supporting wheel, a seat mounted on the side walls of the body intermediate the ends thereof, a foot rest rigidly fastened to the steering rod whereby the rod may be foot controlled, a hand steering wheel mounted near the upper end of the steering rod within reach of the occupant of the seat, and a steering arm pivotally mounted on the upper end of the steering rod for rotation about a horizontal axis, said arm being adapted to be swung forwardly for use as a tongue member, and to be swung rearwardly within reach of an operator standing in the rear of the body.

8. A toy vehicle comprising a forward supporting and steering wheel, rear supporting wheels, a body having bottom, end and side walls with the bottom wall substantially in the plane of the axis of said forward and rear wheels and stopping short of the forward wheel, said side walls converging forwardly and having their lower portions constructed to clear the forward supporting wheel, an upwardly extending steering rod connected with said forward supporting and steering wheel, a hand steering wheel mounted near the upper end of the steering rod, a seat mounted on the body forwardly of the rear supporting wheels and within reach of said hand steering wheel, and a steering arm pivotally mounted on the upper end of said steering rod for rotation about a horizontal axis, said arm being adapted for a tongue member when swung forwardly, and when swung rearwardly extending back substantially to the rear of the body.

In testimony whereof, I have hereunto set my hand.

HENRY ZIEMSS, Jr.